Patented June 21, 1927.

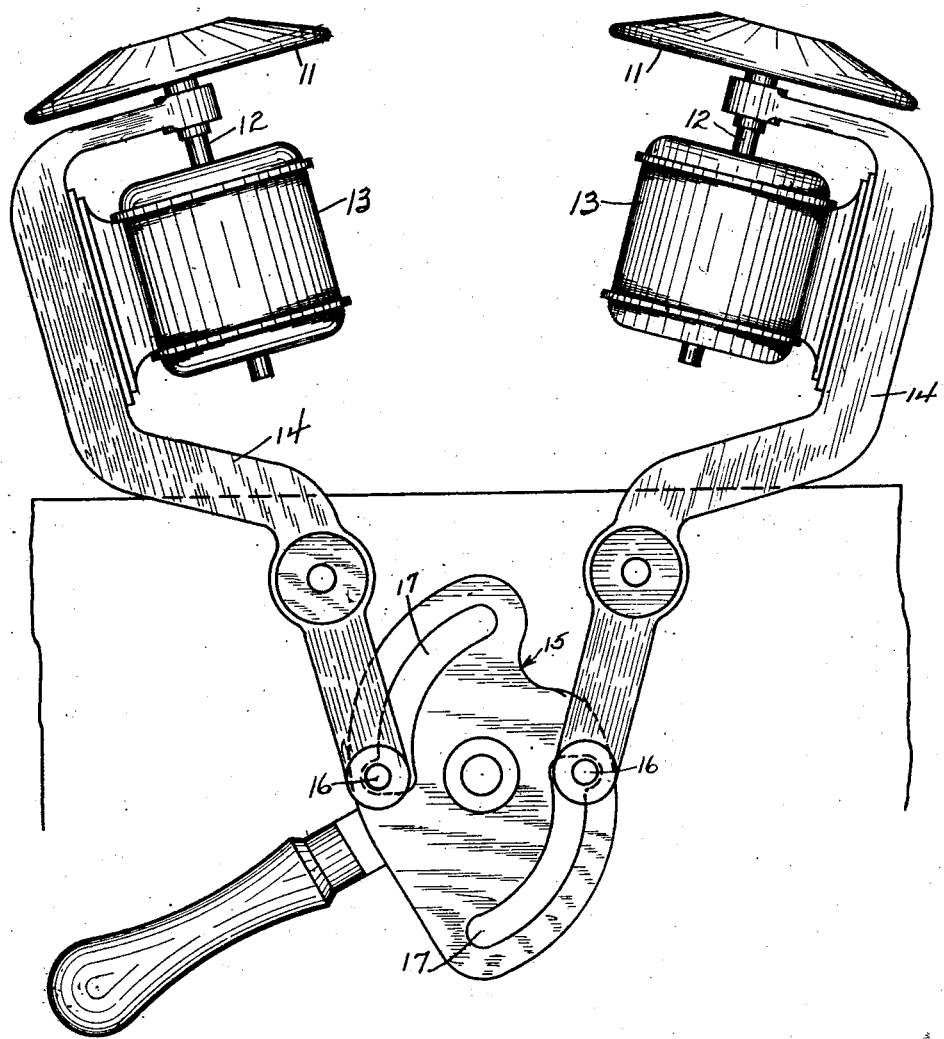

1,633,326

UNITED STATES PATENT OFFICE.

DANIEL EDWARD HENNESSY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

STITCHING.

Application filed July 31, 1922. Serial No. 578,749.

In building a cord tire on the present tire building machines a single ply of cord fabric is placed on the core and either the core held stationary and the stitcher on one side rotated in one direction and that on the other side rotated in the opposite direction to stretch the cords or the core is rotated and one side stitched down and stretched and then the core reversed and the other side stitched and stretched. My invention provides improved means for applying either a single ply of cord fabric or a plurality of plies of cord fabric having the cords of all plies lying at about the same angle.

In the drawings accompanying this specification and forming a part thereof I have shown, for purpose of illustration, one form which my invention may assume. In these drawings:

The single figure is a plan view of this illustrative embodiment.

In the drawings I have shown a pair of stitching rollers 11 each secured on the shaft 12 of a motor 13 mounted on a stitcher arm 14 which also supports the shaft 12. The stitching rollers 11 are swung in and out by the cam 15 acting on the rollers 16 mounted on the arms 14 and traveling in the grooves 17 of the cam 15.

In using this device a ply of cord fabric is placed on a core and the core and stitching rollers rotated. The rollers on one side of the core are rotated faster and the rollers on the other side slower than the peripheral speed of the core to thus exert a pulling action on both ends of all of the cords. The speeds of the rollers can be varied so that in laying a ply of fabric in which the cords are at right angles to the cords of the preceding ply, the roller that was rotated faster than the core can be rotated slower than the core and the roller which was rotated slower rotated faster than the core to again equally stretch both ends of all of the cords. A plurality of plies having the cords at about the same angle may be stitched down and stretched in a single operation.

I have disclosed a specific embodiment of my invention but this disclosure is illustrative only and my invention is not limited thereto.

I claim:

The method of building cord tire carcasses which comprises placing the cord fabric on a core, rotating the core, stitching down the fabric on one side of the core with a stitcher operating at a speed greater than that of the core and simultaneously stitching down the fabric on the other side of the core with a stitcher operating at a speed less than that of the core.

In testimony whereof I have signed my name to the above specification.

DANIEL EDWARD HENNESSY.